United States Patent [19]

Mohr et al.

[11] Patent Number: 4,707,213
[45] Date of Patent: Nov. 17, 1987

[54] INDUCTION HEATING UNIT FOR HEAT BONDING A LID HAVING A METALLIC LAYER TO A CONTAINER

[75] Inventors: Glenn R. Mohr, Linthicum, Md.; Donald J. Roth, Westport, Conn.

[73] Assignee: Continental Can Company, Inc., Norwalk, Conn.

[21] Appl. No.: 796,776

[22] Filed: Nov. 12, 1985

[51] Int. Cl.⁴ ............................................. B32B 31/26
[52] U.S. Cl. .................................. 156/380.2; 156/69; 156/380.6; 156/580; 156/583.1; 53/329; 53/373; 219/10.73; 219/10.79
[58] Field of Search ................... 156/69, 272.4, 273.7, 156/379.7, 583.1, 379.8, 380.2, 380.6, 580; 53/373, 387, 329, 388; 219/9.6, 10.43, 10.73, 10.53, 10.29

[56] References Cited

U.S. PATENT DOCUMENTS

| | | | |
|---|---|---|---|
| 3,561,982 | 2/1971 | Oeth | 53/425 |
| 3,604,880 | 9/1971 | O'Neill | 156/69 |
| 3,808,074 | 4/1974 | Smith | 156/272.4 |
| 3,864,892 | 2/1975 | Molvar | 156/583.1 |
| 4,011,119 | 3/1977 | Mitchell | 156/69 |
| 4,224,494 | 9/1980 | Reboux | 219/10.73 |
| 4,380,484 | 4/1983 | Repik | 156/380.2 |
| 4,535,211 | 8/1985 | Carter | 219/10.79 |

Primary Examiner—Donald E. Czaja
Assistant Examiner—Merrell C. Cashion, Jr.
Attorney, Agent, or Firm—Charles E. Brown

[57] ABSTRACT

This relates to an apparatus for heat bonding a lid having a metallic layer to a plastic container. The container, filled with a product, is seated in a nest and a lid is seated in place thereon. There is at least one corner on the lid and projecting from that corner is a pull tab. An induction heating unit is associated with the lid and presses it tightly against the container while inducing electrical energy under controlled conditions into the metal layer. The induction heating unit is provided with a specific arrangement of ferrite members for controlling the induction of current into the metallic layer. The ferrite parts in conjunction with the induction coil serve to concentrate the induced electrical energy into substantial alignment with the induction coil notwithstanding the fact that there is a corner and there is projecting from the corner of the lid a pull tab.

15 Claims, 15 Drawing Figures

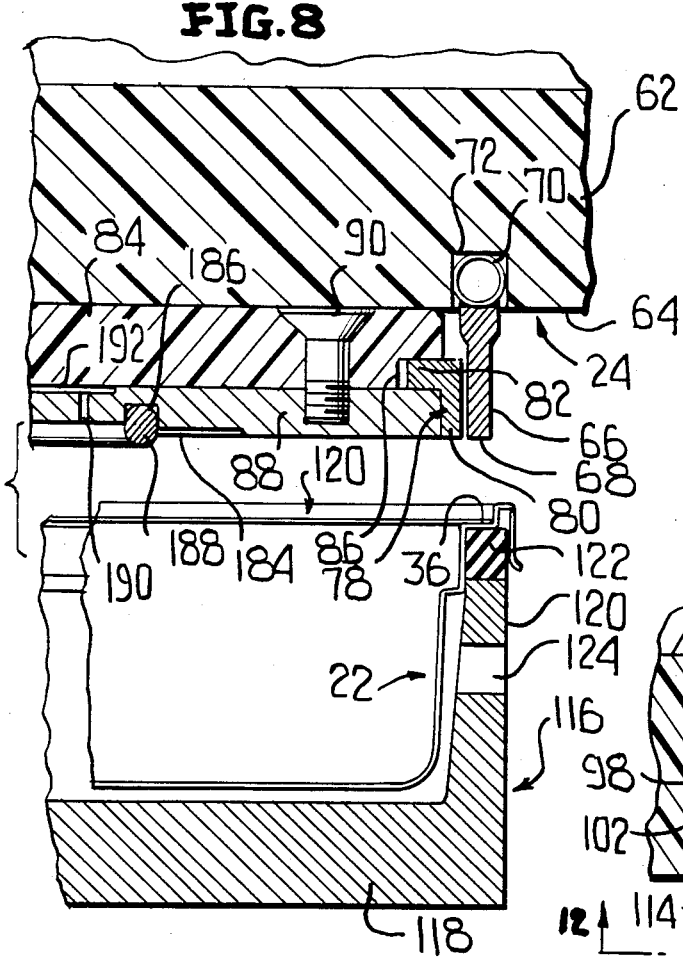
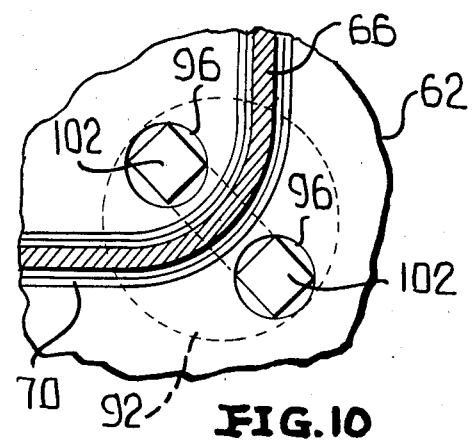
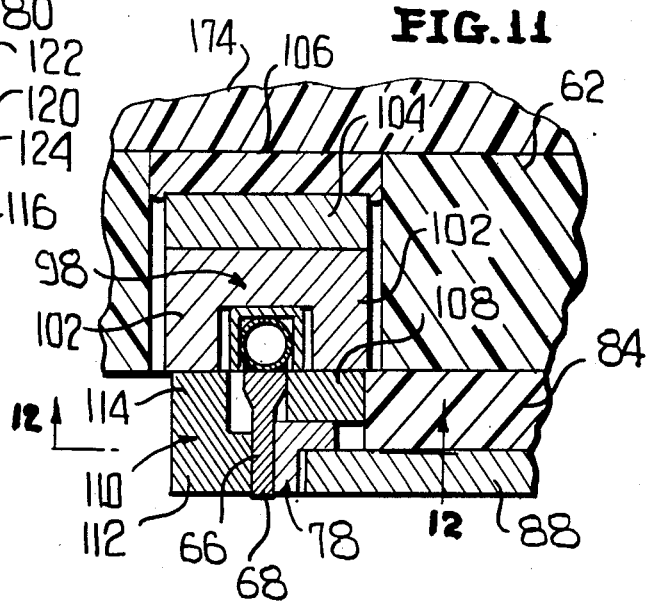
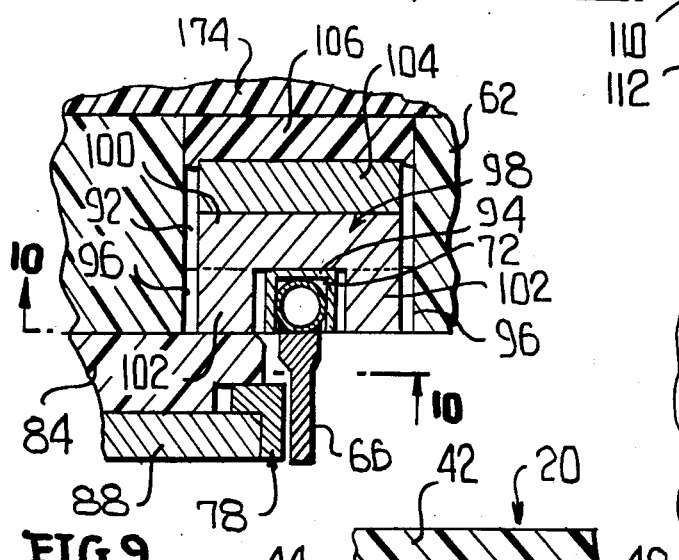
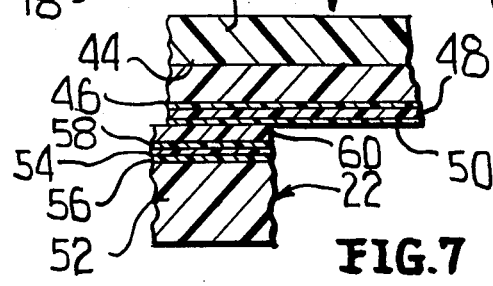
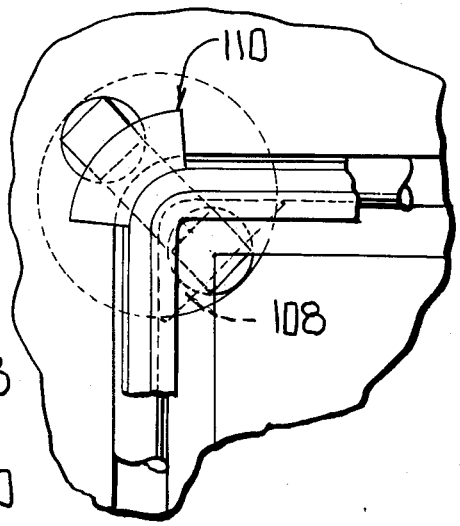

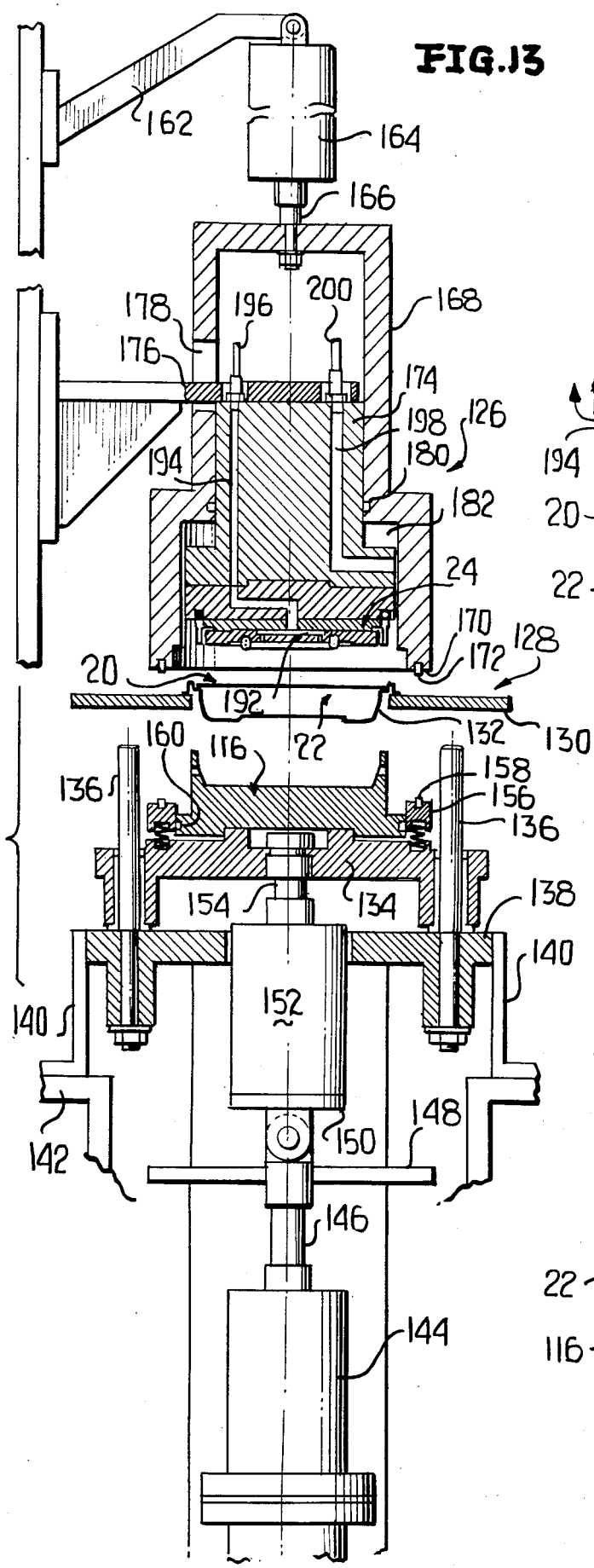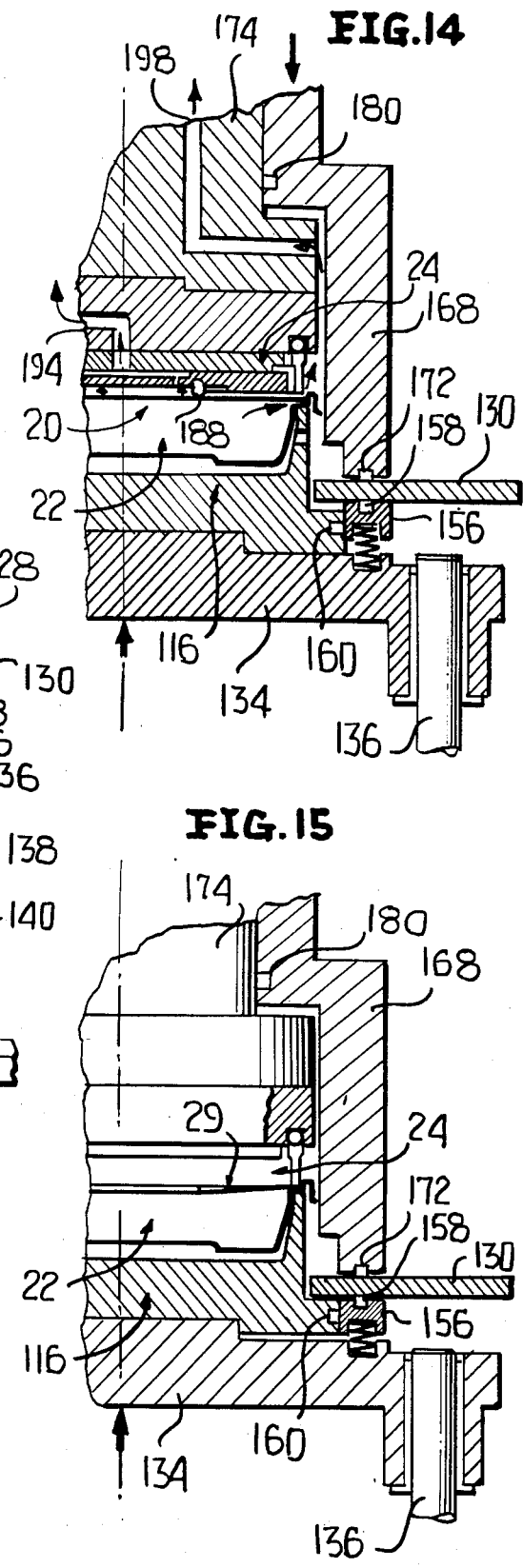

INDUCTION HEATING UNIT FOR HEAT BONDING A LID HAVING A METALLIC LAYER TO A CONTAINER

This invention relates in general to new and useful improvements in the application of closures to containers, and more particularly the application of a primarily plastic lid to a plastic container.

In accordance with this invention there is provided a container, which is preferably box-like, formed of a suitable plastic material and having an exposed surface formed of a heat bondable plastic material. The container is closed by way of a lid which is also primarily formed of plastic but which has incorporated therein a metallic layer into which electrical energy may be induced. The lid has an exposed undersurface which is also formed of a heat bondable plastic material, which plastic material of the lid is heat bondable to the plastic material of the container.

It is known that one my induce electrical current into metal for the purpose of heating the metal. The heat pattern induced into the metal is generally in accordance with the configuration of an induction coil. It is also known to utilize ferrite as a means for controlling the introduction of current into the metallic material. This invention relates to a specific heating unit including a specific relationship of the induction coil to ferrite current concentrators. It is the purpose of this invention to uniformly concentrate the introduction of electrical current into the metallic layer of the lid so as to provide for a concentration of the heating of the lid and container opposed surfaces along a narrow pattern with such heating and thus bonding being uniform throughout the length of the heating pattern. By concentrating the heat, less energy is expended in the heat bonding of the lid to the container, and a more uniform bond is obtainable. This, in turn, provides not only for a better package, but also for a lower power source and a shorter time of operation.

Other problems are involved. Most particularly, since the lid has rounded corners, the concentration of induced electrical current must be specifically controlled in the corners.

Next, not all corners of the lid are identical. In order to minimize the force required to effect peeling of the lid from the container during the opening of the container, at least that corner where peeling is initiated is provided with a very small radius.

In addition, the lid, in order to facilitate removal, is provided with a projecting pull tab. The pull tab is formed of the same material as the lid with the result that it includes the metallic layer which absorbs certain of the electrical current and also certain of the heat from the metallic layer of the lid. Special efforts must be taken to compensate for the existence of the pull tab.

With the above and other objects in view that will hereinafter appear, the nature of the invention will be more clearly of the invention will be more clearly understood by reference to the following detailed description, the appended claims, and the several views illustrated in the accompanying drawings.

FIG. 7 is an enlarged fragmentary sectional view taken through the lid and the container and shows the various material of the two.

FIG. 8 is an enlarged fragmentary vertical sectional view taken through a nest having a container and lid to be heat bonded together seated thereon and being associated with the induction heating unit of this invention, the view being taken generally along the line 8—8 of FIG. 1.

FIG. 9 is an enlarged fragmentary sectional view taken generally along the line 9—9 of FIG. 1 and shows the specific arrangement of ferrite with respect to one corner of the induction coil for heating one corner of the lid.

FIG. 10 is a fragmentary horizontal sectional view taken generally along the line 10—10 of FIG. 9 and shows further the relationship of the ferrite with respect to the induction coil.

FIG. 11 is an enlarged fragmentary vertical sectional view taken through that corner of the induction heating unit which is associated with the corner of the lid having projecting therefrom a pull tab, the view showing the specific arrangement of ferrite at that corner of the heating unit.

FIG. 12 is an enlarged fragmentary horizontal sectional view taken generally along the line 12—12 of FIG. 11 and shows further the details of the ferrite with respect to the induction coil.

FIG. 13 is a schematic elevational view with parts broken away and shown in section of an apparatus incorporating the nest and induction heating unit of FIG. 8 in the automatic heat bonding of lids to containers.

FIG. 14 is an enlarged fragmentary sectional view taken through the central portion of the apparatus of FIG. 13 and shows a vacuum being applied to the container immediately before the heat bonding of the lid to the container.

FIG. 15 is an enlarged fragmentary sectional view similar to FIG. 14 and shows the final relationship of the components during the heat bonding of the lid to the container.

Figure 1:
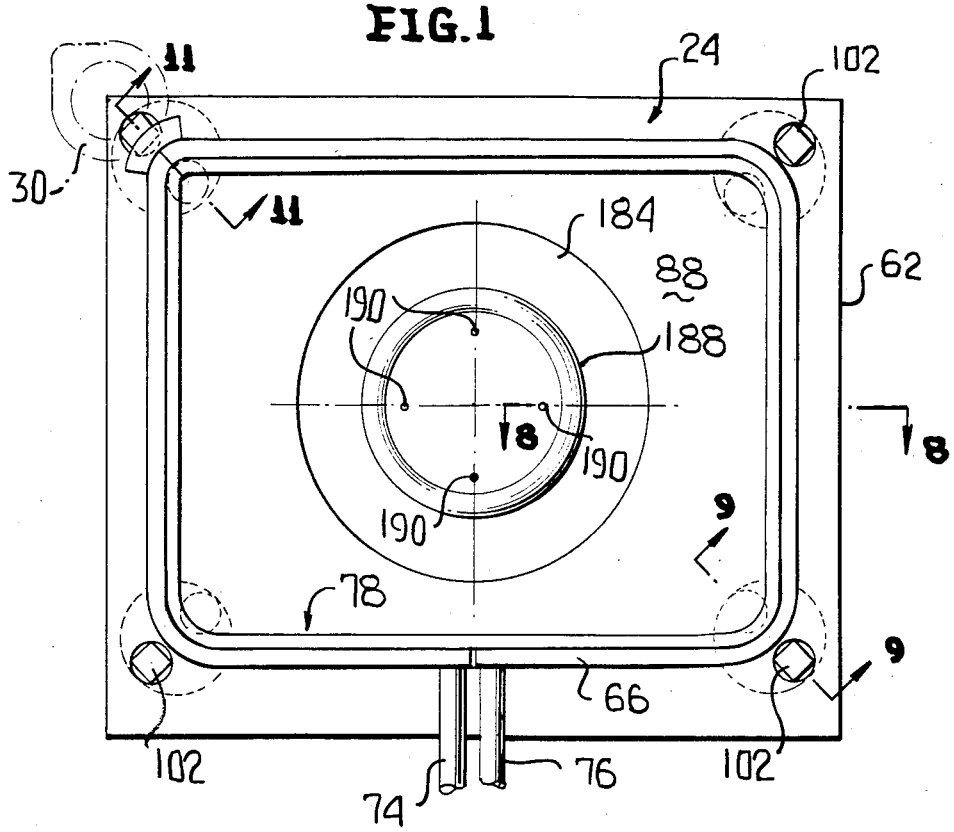
FIG. 1 is a bottom plan view of an induction heating unit formed in accordance with this invention and having associated therewith in phantom line a pull tab of a lid intended to be heated utilizing the heating unit.
Figure 2:
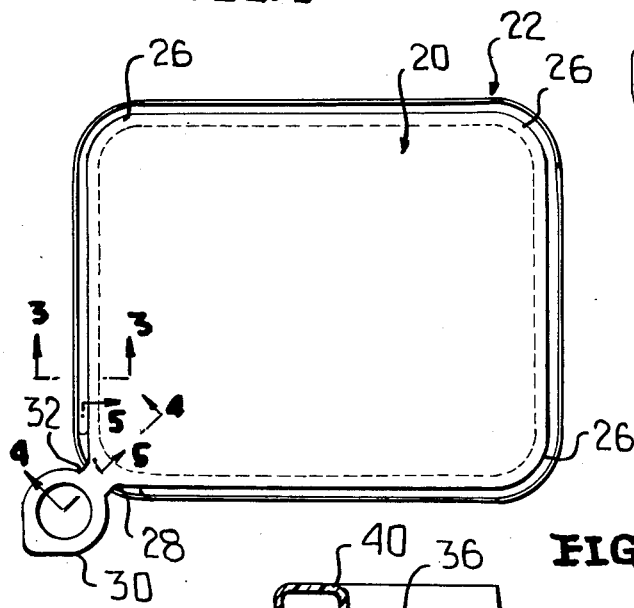
FIG. 2 is a top plan view of a container having seated thereon a lid to be bonded thereto in accordance with the invention.

Referring now to the drawings in detail, it will be seen that there is illustrated in FIG. 2 a typical environment of the invention wherein a lid, generally identified by the numeral 20, is to be heat bonded to a container 22 utilizing an induction heating unit which is generally illustrated in FIG. 1 and is identified by the numeral 24. In the illustrated embodiment of the container 22 and the lid 20, there are four sides joined by four corners with three of the corners being identical and the fourth corner being of a smaller radius. The three corners are identified by the numeral 26 while the fourth corner is identified by the numeral 28 and has projecting therefrom a pull tab 30 which is connected to the remainder of the panel by way of a narrow neck 32.

Figure 3:
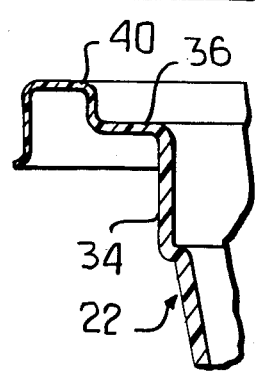
FIG. 3 is an enlarged fragmentary vertical sectional view taken generally along the line 3—3 of FIG. 3 and shows the general cross section of an upper part of the container.
Figure 4:
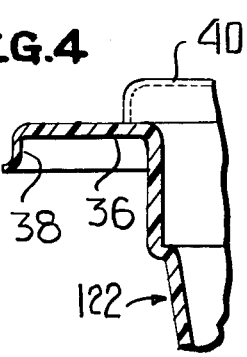
FIG. 4 is an enlarged fragmentary sectional view through the container taken generally along the line 4—4 of FIG. 2 and shows the cross section of an upper part of the container in the area which receives the pull tab of the lid.
Figure 5:
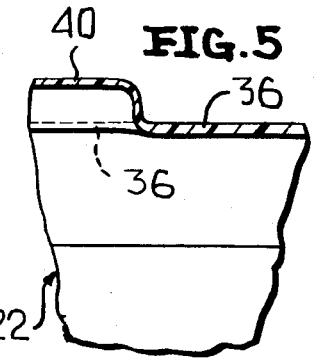
FIG. 5 is an enlarged fragmentary vertical sectional view taken generally along the line 5—5 of FIG. 2 and shows the difference in thickness of adjacent portions of a flange of the container, which flange is seated on a nest for supporting the container during the bonding of a lid thereto.

Referring now to FIGS. 3, 4 and 5, it will be seen that the container 22 is of a stepped wall construction including an upper wall part 34 which terminates in an outwardly directed flange 36. The flange 36, in turn, terminates in a depending reinforcing flange 38.

The lid 20 is to be heat bonded to the upper surface of the flange 36. In order that the lid may be easily and accurately positioned relative to the flange 36, the flange 36 has formed therefrom an upwardly directed rib 40 which is of an inverted channel shaped cross section and which extends entirely about the periphery of the flange 36 except at the corner 28. It will be seen that when the rib 40 is formed from the flange 36, the thickness of the flange is diminished as opposed to its thickness where there is no rib. This reduction in thickness is best illustrated in FIG. 5 and will be discussed more hereinafter.

Reference is now made to FIG. 7 wherein it will be seen that both the lid 20 and the container 22 are of a multilayered construction. The lid is preferably, but not limited to an outer layer 42 formed of a polypropylene copolymer. The outer layer 42 is directly bonded to an intermediate layer 44 formed of a homopolymer with the layer 44 having bonded thereto a very, very thin layer 46 of a plastic adhesive which will bond to the homopolymer layer 44 and a metal foil layer 48 which is preferably formed of aluminum. There is a final layer 50 which is similar to the layer 46.

The container 22, on the other hand, is generally of a thermoformed construction and includes the base layer 52 which is formed of a suitable polypropylene. A barrier layer 54, such as SARAN, EVAL and the like, is bonded to the base layer 52 by a very thin plastic adhesive layer 56. A similar layer 58 bonds the barrier layer 54 to a special layer 60 which is of a construction wherein when subject to a peeling action will internally fracture or separate. In accordance with this invention, the lid 20 is to be applied to the container 22 by way of a heat bond between the layers 50 and 60 with the heat bond being of a very controlled nature and being formed by induction heating through the inducing of a current into the metal layer 48 under controlled conditions.

Referring now to FIG. 8, it will be seen that the induction heating unit 24 includes a support 62 formed of a suitable plastic material so as to have insulating characteristics. The support 62 has a face 64 from which a solid induction coil 66 depends. The induction coil 66 has an exposed face 68 which is intended to engage the outer surface of the lid 20 and a tubular base 70 to which the solid induction coil 66 is preferably secured such as by silver soldering. The face 64 of the support 62 is provided with a peripheral recess or groove 72 in which the tubular base 70 is seated.

As is customary, the induction coil 66 is provided with twin leads 74, 76 which, in turn, will be coupled to a suitable source of high frequency electrical energy (not shown).

At this time, it is pointed out that when the induction heating unit 24 performs satisfactorily, substantially only that portion of the lid 20 and the container 22 aligned with the face 68 of the induction coil 66 will be heated. When proper bonding occurs, the layers 50 and 60 will be heat bonded together as previously described.

When the lid 20 is peeled from the container, the layer 60 will internally rupture and that part of the layer 60 bonded to the layer 50 will remain bonded to the layer 50, thus providing a clear indication of the extent and quality of the heat bond between the layers 50, 60. Further, by permitting the layer 50 to be natural in color, i. e. generally transparent, and by coloring the layer 60 white or a similar color, it will be immediately apparent as to the extent of the heat bond between the layers 50, 60.

Figure 6:
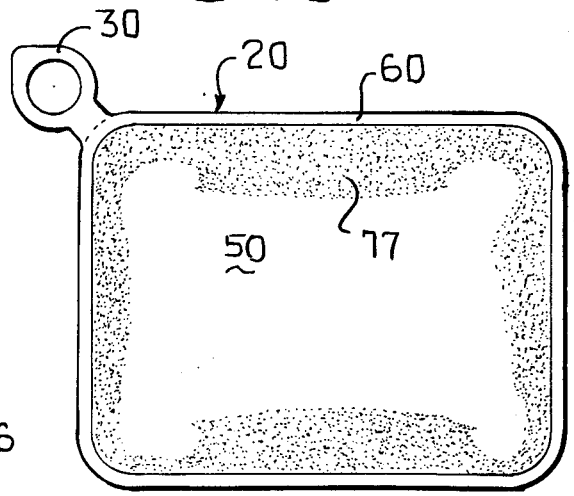
FIG. 6 is a bottom plan view of a lid which had been bonded to a container and removed showing the general pattern of the heat bond as well as the general pattern of heating of the lid in the forming of that heat bond without a specific arrangement of current concentration utilizing ferrite material in accordance with this invention.

On the other hand, the layer 50 will discolor in the areas where it is heated. In order to obtain maximum efficiency and maximum concentration of the induced current, it is desired that the induced current into the lid, as well as into the container, be substantially in alignment with the face 68 of the induction coil 66. On the other hand, there is illustrated in FIG. 6 a lid 20 which was bonded to a container 22 and then peeled therefrom, which lid was heat bonded to the container during an early phase of the development of the induction heating unit. It will be seen that within the ruptured band of the layer 60 the layer 50 is discolored to define heated areas 77 well within the confines of the bond between the layers 50, 60. The net result was that while from time to time satisfactory bonds between the layers 50 and 60 could be obtained, there was a certain degree of overheating and most particularly a large waste of energy. This large of waste of energy required not only a heating unit with greater capacity, but also more operational time. In a properly heated lid, the heat zones 77 would be substantially nonexistent.

It will be seen from the heat pattern 77 of FIG. 6 that conditions along the straight sides of the lid were quite different from those at the corners of the lid and that much greater control of the induced current was required along the corners.

At this time it is pointed out that subsequent to the heat bonding of the lid illustrated in FIG. 6 to a container, the configuration of the heat bond between the lid and the container has been changed so as to provide for the relatively sharp corner 28 adjacent the pull tab 30.

Returning once again to FIG. 8, as well as FIG. 1, it will be seen that disposed radially inwardly of the induction coil 66 is a first ferrite member identified by the numeral 78. The ferrite member 78 is generally L-shaped and includes a vertical leg 80 which is disposed closely adjacent to and parallel to the lower part of the induction coil 66. The ferrite member 78 also includes a horizontal leg 82 disposed at the upper end of the leg 80 and extending generally radially inwardly away from the induction coil 66. It is to be noted that the leg 82 is seated on a spacer 84, which in turn, is seated on the face 64 of the support 62. The spacer 84 is provided with a peripheral notch 86 in which the leg 82 seats.

The leg 82 is clamped against the spacer 84 by a current director 88 which engages the underside of the leg 82. The current director 88 is secured to the spacer 84 by means of suitable fasteners 90. It is to be understood that the current director 88 is preferably formed of a sheet of aluminum.

While the ferrite member 78 does adequately function to concentrate the induced heat in the lid 20 to that portion generally aligned with the face 68 of the induction coil 66 along the straight edges of the lid 20, special current concentration must be effected at the corners. Furthermore, the current concentration at the corners 26 will be different from that at the corner 28 because of the influence of the pull tab 30.

Referring now to FIGS. 9 and 10, which is a typical construction of the induction heating unit 24 for a corner 26, it will be seen that there is formed in the upper surface of the support 62 centered on the induction coil 66 at the center of the curvature of the corner 26 a square end bore 92 which is of a depth to leave only a shallow strip of the material of the support 62 at the top of the groove 72, the strip being identified by the numeral 94.

In addition to the bore 92, whose position is best shown in FIG. 10, at each corner 26 there is also a pair of small diameter bores 96 whose positions are best illustrated in FIG. 10.

An inverted U-shaped ferrite member 98 has a cross bar portion 100 thereof seated in the bore 92 and depending legs 102 extending through the bores 96.

Overlying the cross bar portion 100 is another ferrite member 104 which is similar to the cross bar portion 100.

A silicone sponge member 106 is pressed into the upper portion of the bore 92 and serves to hold the ferrite members 98 and 104 clamped in position.

It is to be understood that the ferrite members 98 and 104, together with the ferrite member 78, serve to control the flow of induced current into the metallic layer 48 so as to concentrate the heating of the layers 50 and 60 to an area aligned with a corner portion of the induction coil face 68.

At the corner 28, not because of the change in configuration, but because of the existence of the pull tab 30, the flow of induced current at the corner 28 is different from that at the corner 24. Accordingly, there are provided additional ferrite members. The additional ferrite members include a generally triangular ferrite member 108 which is positioned adjacent the base of the induction coil 66 radially inwardly thereof and between the ferrite member 98 and the ferrite member 78, as is best shown in Figures 11 and 12. In order to receive the ferrite member 108, the spacer 84 is cut away at the corner 28 as will be obvious from a comparison of FIGS. 9 and 11.

There is also provided a ferrite member 110 which is arcuate in plan and angular in elevation. The ferrite member 110 has a base 112 which is seated against the lower portion of the induction coil 66, as is shown in FIG. 11, while extending around the corner 28 with the induction coil as shown in FIG. 12. The ferrite member 110 also includes an upstanding leg 114 which abuts against the end of the associated leg 102 of the ferrite member 98. It has been found that the ferrite members 108 and 110 compensate for the existence of the pull tab 30 and more particularly with respect to the metallic layer thereof so that the heating of the layers 50 and 60 at the corner 28 is substantially maintained in alignment with the face 68 of the induction coil 66.

Reference is now made to FIG. 8 wherein it is illustrated that when the lid 20 is being applied to the container 22, the flange or rim 40 of the container is supported by a nest generally identified by the numeral 116. The nest 116 is a hollow member including a base 118 and an upstanding side wall 120. The upper end of the side wall 120 carries a plastic member 122 which forms the direct support for the flange 40. In order that a vacuum may be drawn within the nest 116 surrounding the container 22, suitable openings 124 are formed in the upstanding wall 120.

It is to be understood that the support 122 not only has insulating characteristics, both electrical and heat, but also that it have a certain degree of resiliency so that when the lid 20 is forced against the flange 36 by the heating unit 24, there will be a certain degree of compensation for the difference in thickness of the flange 36 at the corner 28 as opposed along the straight line portions of the lid.

It is to be understood that a vacuum is to be drawn within the container prior to the application of the lid 20. It is further desirable that the lids 20 be heat bonded to the containers 22 on an automatic basis. Accordingly, there is provided a suitable automatic apparatus which is illustrated in FIGS. 13, 14 and 15 and is generally identified by the numeral 126.

First of all, there is a conveyor 128 for delivering a filled container 26 having a lid 20 loosely seated thereon to the apparatus 126. The conveyor 128 may be in the form of a plurality of interconnected plates 130 which have central openings 132 for receiving the containers 22 while supporting the containers by engaging the flanges 38 thereof. It is to be understood that the conveyor 128 will move normal to the FIG. 13 illustration.

The nest 116 is carried by an upwardly movable support 134 which is mounted for straight line movement on a plurality of pins 136 which, in turn, are carried by a base member 138. The base member is carried by brackets 140 which, in turn, are carried by a support member 142.

The support 142 has mounted therein a first linear fluid motor 144 having a piston rod 146 which is provided at its free end with a guide rod 148. The piston rod 146 has its free end connected to a base 150 of a second extensible motor 152. The motor 152 has a piston rod 154 which is coupled to the support 134 for the nest 116.

The support 134 has mounted in spring loaded relation thereabove and surrounding the base of the nest 116 a peripheral sealing member 156 which carries an upwardly facing sealing ring 158. The base of the nest 116 is provided with a sealing ring 160 about the periphery thereof with the sealing ring 160 contacting the inner surface of the sealing member 156 to maintain a sealed sliding relationship with respect thereto.

Mounted above the base 142 is a suitable support 162 which carries in depending relation an extensible fluid motor 164. The motor 164 has a piston rod 166 which is connected to an upper part of a housing 168. The housing 168 has a sealing face 170 which opposes the sealing member or ring 156 and carries a sealing element or ring 172.

There is mounted within the housing 168 a fixed support 174 which is carried by a suitable hanger type support 176 that extends through a slot 178 in the housing 168. The support 174 has mounted thereon on the underside thereof the induction heating unit 24.

The interior of the housing 168 carries a sealing ring 180 which engages the outer periphery of an upper part of the support 174 so as to maintain in the lower portion of the housing 168 a sealable compartment 182.

At this time, with reference to FIGS. 1 and 8, it is to be noted that the underside of the current director 88 there is provided a machined central surface portion 184. An annular groove 186 is machined in this surface portion and has seated therein an O-ring 188. The O-ring 188 projects down below the lower surface of the director 88 and is adapted to come into sealing engagement with the upper surface of the lid 20.

Within the area defined by the sealing ring 188 there is a plurality of vacuum ports 190 which are connected to a vacuum manifold 192.

Returning to FIG. 13, it will be seen that the vacuum manifold 192 is connected to a vacuum passage 194 formed in the support 174 which in turn, is connected to a vacuum line 196. A further vacuum passage 198 is formed in the support 174 and opens through the periphery of the support 174 within the housing 168. The vacuum passage 198 is connected to a second vacuum line 200.

OPERATION

It is to be understood that a container 22, filled with a product and having the lid 20 loosely seated thereon will be delivered by the conveyor 128 into the space between the nest 116 and the induction heating unit 124 and in alignment therewith. At this time the fluid motors 144 and 166 will be actuated so as to move the support 134 and the nest 116 upwardly while the body 168 moves downwardly. The nest 116 will pick the filled container 22 up off of the plate 130 of the conveyor 128 and move the container 22 and lid 20 to a position closely adjacent to the induction heating unit 24. At that time the ring member will be moved to a position wherein the sealing ring 158 thereof will engage the underside of the conveyor plate 130 and form a seal therewith. At the same time the lower face 170 of the housing 168 will approach the upper surface of the plate 130 and the sealing ring 172 carried thereby will form a seal with the upper surface of the plate 130. Vacuum is now drawn through the vacuum lines 196 and 200 with preferably the vacuum being drawn through the line 196 shortly in advance of the vacuum being drawn through the line 200. The net result is that the lid 20 will be lifted minutely off of the container 22 and held against the underside of the O-ring 188. A vacuum will be drawn within the sealed off chamber defined in part by the housing 168, in part by the plate 130 and in part by the nest 116. Since the lid 20 has been lifted off of the container 22, the vacuum through the vacuum line 200 will be drawn within the container 22. After this occurs, the extensible fluid motor 152 will be actuated to further move the nest 116 upwardly so that the lid 20 engages the face 68 of the induction coil 66 at the preselected pressure.

Then when the lid 20 is tightly clamped against the flange 36 of the container 22, the induction coil 66 will be temporarily energized so as to induce current into the metallic layer 48 for a sufficient time to effect the heating of the layers 50 and 60 to a self bonding temperature substantially only in alignment with the face 68 of the induction coil 66.

As soon as the energization of the induction coil 66 has been completed, the extensible motors 144, 152 and 164 will be actuated in the opposite direction to open the apparatus 126 and to permit the conveyor plate 130 to move out from between the induction heating unit 24 and the nest 116 carrying the sealed container. The removal of the one conveyor plate 130 will be followed by the movement of a next following conveyor plate and container and lid assembly to move into position for heat bonding of that lid to that container.

Although only a preferred embodiment of the induction heating unit and the utilization thereof have been specifically illustrated and described herein, it is to be understood that minor variations may be made therein without departing from the spirit and scope of the invention as defined by the appended claims.

We claim:

1. An induction heating unit for heat bonding a lid or the like having a metallic layer to a container or the like wherein a resultant line of heat bond includes at least one corner, said unit comprising an induction coil having a loop configuration in accordance with the outline of said resultant line of heat bond and including at least one corner, said induction coil having a lid engaging face, a ferrite current concentrator positioned alongside said induction coil for concentrating induced current in a lid or the like metallic layer to substantially the outline of said induction coil, and a ferrite current concentrator unit at said one corner.

2. A unit in accordance with claim 1 wherein said ferrite current concentrator is disposed radially within said induction coil and has an angular cross section including one leg extending parallel to said induction coil and a second leg extending normal to said induction coil and being disposed remote from said induction coil face.

3. A unit according to claim 2 wherein a non-ferrous metallic sheet-like member forming a current director is seated within the outline of said ferrite current concentrator.

4. A unit according to claim 1 wherein said ferrite current concentrator is generally U-shaped in cross section, said induction coil has a base, and at said corner said base is seated within the outline of said ferrite current concentrator unit.

5. A unit according to claim 4 wherein said ferrite current concentrator unit is spaced from said ferrite current concentrator.

6. An induction heating unit for heat bonding a lid or the like having a metallic layer to a container or the like wherein a resultant line of heat bond includes at least one corner, said unit comprising an induction coil having a loop configuration in accordance with the outline of said resultant line of heat bond and including at least one corner, a ferrite current concentrator positioned alongside said induction coil for concentrating induced current in a lid or the like metallic layer to substantially the outline of said induction coil, and a ferrite current concentrator unit at said one corner, said ferrite current concentrator being generally U-shaped in cross section, said induction coil having a base, and at said corner said base being seated within the outline of said ferrite current concentrator unit, said induction coil being carried by a support, said support having a peripheral groove in one face thereof receiving said induction coil base, said ferrite current concentrator unit including a cross bar portion and two spaced parallel legs, said support having therein at said corner a flat bottom bore terminating adjacent to but spaced from said induction coil base, and two second and smaller bores extending from said flat bottom bore on each side of said induction coil base, said cross bar portion being within said flat bottom bore, and said legs being within said second bores.

7. A unit according to claim 6 wherein a resilient plug is seated in said flat bottom bore fore holding said ferrite current concentrator unit in place in said support.

8. A unit according to claim 4 wherein said lid or the like has a projecting pull tab at said one corner, and there are further ferrite concentrators at said corner on opposite sides of said induction coil.

9. A unit according to claim 8 wherein one of said further ferrite current concentrators is radially within said induction coil and touches both the first mentioned ferrite current concentrator and said ferrite current concentrator unit.

10. A unit according to claim 9 wherein a second of said further ferrite current concentrators is disposed radially outwardly of said induction coil and extends from the first mentioned ferrite current concentrator to substantially the full height of said induction coil.

11. A unit according to claim 4 wherein there is a second corner with said lid or the like having a projecting pull tab at said second corner, said second corner also having a U-shaped cross sectional ferrite current concentrator unit, and there are further ferrite current concentrators at said corner on opposite sides of said induction coil.

12. A unit according to claim 1 wherein a non-ferrous metallic sheet-like member forming a current director is seated in said ferrite current concentrator.

13. A unit according to claim 12 wherein said current director has an exposed face, a sealing ring is carried by said current director for sealing engagement with a lid or the like opposing said unit, and suction means carried by said current director within said sealing ring for drawing a lid or the like against said unit.

14. A unit according to claim 1 wherein said induction coil has an exposed face, there is associated with said unit a nest for receiving a container, said nest has a supporting rim for a container with supporting rim opposing said induction coil face, and means attached to said unit and to said nest for moving said induction coil face and said nest supporting rim together at a preselected pressure.

15. A unit according to claim 14 wherein said container has a peripheral flange, a molded upstanding bead projecting from said flange for centering an associated lid, said lid has a projecting pull tab at said corner, said bead being discontinued at said corner to provide clearance for said pull tab with the result that said peripheral flange changes in cross section at said corner, and said preselected pressure being sufficient to compensate for said thickness differences.

* * * * *